(12) United States Patent
Bard et al.

(10) Patent No.: US 6,607,134 B1
(45) Date of Patent: *Aug. 19, 2003

(54) FINGER-MOUNTED READERS WITH LOW POWER RADIO FREQUENCY COMMUNICATIONS

(75) Inventors: Simon Bard, Setauket, NY (US); Jerome Swartz, Old Field, NY (US); Mitchell H. Maiman, Holbrook, NY (US); Jay Paul White, Bohemia, NY (US); Alistair R. Hamilton, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 304 days.

This patent is subject to a terminal disclaimer.

(21) Appl. No.: 09/604,192

(22) Filed: Jun. 27, 2000

Related U.S. Application Data (63) Continuation-in-part of application No. 08/895,888, filed on Jul. 17, 1997, now Pat. No. 6,145,746, and a continuation-in-part of application No. 09/407,191, filed on Sep. 28, 1999, now Pat. No. 6,142,379.

(51) Int. Cl.⁷ ............................................. G06K 7/10
(52) U.S. Cl. ........................... 235/472.01; 235/462.44; 235/462.46
(58) Field of Search ....................... 235/462.44, 462.45, 235/462.46, 472.01, 472.02

(56) References Cited

U.S. PATENT DOCUMENTS

| | | | |
|---|---|---|---|
| 5,610,387 A | * 3/1997 | Bard et al. ............. | 235/462.44 |
| 6,149,063 A | 11/2000 | Reynolds et al. | |
| 6,202,930 B1 | * 3/2001 | Plesko ................... | 235/462.43 |

* cited by examiner

Primary Examiner—Karl D. Frech
(74) Attorney, Agent, or Firm—Kirschstein, et al.

(57) ABSTRACT

A radio frequency transmitter supported by a finger-mounted reader transmits decoded digital data signals to a remote host computer by a low power, wireless, communications protocol. A beeper worn by a user generates a sound indicative of the receipt of the data signals by the host computer.

24 Claims, 11 Drawing Sheets

FINGER-MOUNTED READERS WITH LOW POWER RADIO FREQUENCY COMMUNICATIONS

CROSS-REFERENCE TO RELATED APPLICATIONS

This application is a continuation-in-part of U.S. patent application Ser. No. 08/895,888, filed Jul. 17, 1997, now U.S. Pat. No. 6,145,746, and is also a continuation-in-part of U.S. patent application Ser. No. 09/407,191, filed Sep. 28, 1999, now U.S. Pat. No. 6,142,378.

BACKGROUND OF THE INVENTION

1. Field of the Invention

This invention generally relates to a portable electro-optical reader in a system for reading indicia of varying light reflectivity and, in particular, to a compact bar code symbol reader mounted on an index finger of a user such that the natural pointing direction of the index finger aims the reader and, more particularly, to a finger-mounted reader that communicates with other system components by a low power, wireless, radio frequency, communications protocol.

2. Description of the Related Art

Various electro-optical readers and systems have been developed heretofore for reading indicia such as bar code symbols appearing on a label or on a surface of an article. In its simplest form, the symbol itself is a coded pattern of indicia comprised of, for example, a series of bars of various widths spaced apart from one another to bound spaces of various widths, the bars and spaces having different light reflecting characteristics.

The scanning of bar code patterns has become more complex as bar code patterns have become both more complex and more compact. The typical bar code pattern includes lines and spaces of different widths extending in an x direction, and can be scanned by one or more linear scans in the x direction. Moreover, because the direction of the scan is not always precisely aligned with the direction of the bar code pattern, more complex omnidirectional scanning patterns are sometimes used, wherein consecutive scan lines are angularly displaced relative to one another to form a complex omnidirectional scanning pattern. Two dimensional (2D) bar code patterns (Code 49) have also been introduced wherein, in addition to a typical bar code pattern having lines and spaces of varying widths along an x direction, typical bar code patterns are stacked one upon the other in the y direction to form the 2D bar code pattern. Accordingly, scanning of a 2D bar code pattern is more complex, and requires a raster type of scan wherein consecutive x direction scans are displaced in the y direction by the spacing between stacked rows of the 2D bar code pattern to form a raster scan.

The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications in point-of-sale processing, inventory control, and the like. Scanning systems of this general type have been disclosed, for example, in U.S. Pat. Nos. 4,251,798; 4,369,361; 4,387,297; 4,409,470; 4,760,248; and 4,896,026, all of which have been commonly assigned to the same assignee as the present application.

As disclosed in some of the above patents, one embodiment of such a scanning system resides, inter alia, in a portable laser scanner which is grasped and hand-held by a user, which is designed to allow the user to aim the scanner, and more particularly, a light beam emanating therefrom, at a target bar code symbol to be read.

In prior art bar code scanners, the light source in a laser scanner is typically a gas laser or semiconductor laser. The use of a semiconductor device such as a laser diode as the light source in scanning systems is especially desirable because of its small size, low cost and low power requirements. The laser beam is optically modified, typically by a lens, to form a beam spot of a certain size at the target distance. It is preferred that the beam spot size at the target distance be approximately the same as the minimum width between regions of different light reflectivity, i.e., the bars and spaces of the symbol.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

For the purpose of this discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

In order to increase the amount of data that can be represented or stored on a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239, which is hereby incorporated by reference.

A one-dimensional single-line scan, as ordinarily provided by hand-held readers, has disadvantages in reading these two-dimensional bar codes; that is, the reader must be aimed at each row individually. Likewise, the multiple-scan-line readers produce a number of scan lines at an angle to one another so these are not suitable for recognizing a Code 49 type of two-dimensional symbols.

In the scanning systems known in the prior art, the light beam is directed by a lens or similar optical components along a light path toward a target that includes a bar code symbol on the surface. The scanning functions by repetitively scanning the light beam in a line or series of lines across the symbol. The scanning component may either sweep the beam spot across the symbol and trace a scan line across and past the symbol, or scan the field of view of the scanner, or both.

Scanning systems also include a sensor or photodetector which functions to detect light reflected from the symbol. The photodetector is therefore positioned in the scanner or in an optical path in which it has a field of view which extends across and slightly past the symbol. A portion of the reflected light which is reflected by the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol and to the alphanumeric characters represented thereby.

The decoding process in known scanning system usually works in the following manner. The decoder receives the pulse width modulated digital signal from the scanner, and an algorithm implemented in software attempts to decode the scan. If the start and stop characters and the characters between them in the scan are decoded successfully and completely, the decoding process terminates and an indicator of a successful read (such as a green light and/or an audible beep) is provided to the user. Otherwise the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alphanumeric characters so represented.

Laser scanners are not the only type of optical instrument capable of reading bar code symbols. Another type of bar code reader incorporates detectors based upon charge coupled device (CCD) technology. In such readers, the size of the detector is larger than or substantially the same as the symbol to be read. The entire symbol is flooded with light from the reader, and each CCD cell is sequentially read out to determine the presence of a bar or a space. Such readers are lightweight and easy to use, but require substantially direct contact or placement of the reader on the symbol to enable the symbol to be properly read. Such physical contact of the reader with the symbol is a preferred mode of operation for some applications, or is a matter of personal preference by the user.

SUMMARY OF THE INVENTION

Objects of the Invention

Accordingly, it is a primary object of the present invention to provide a compact bar code reader mounted on an index finger of an operator such that the natural pointing direction of the index finger aims the reader.

Another object of this invention is to enable the finger-mounted reader to communicate with a remote host by a low power, wireless, radio frequency protocol to minimize power usage onboard the reader.

A further object of the subject invention is the provision of a compact bar code scanning arrangement which is simple, is capable of producing several different types of scanning patterns, and is capable of achieving high scanning rates.

Features of the Invention

The present invention provides a compact bar code scanner which in different embodiments is capable of scanning in any one of several modes, a linear scan mode in which it scans along a single axis, an omnidirectional scan mode in which it scans with consecutive scan lines which are angularly displaced relative to each other in an omnidirectional scan pattern, such as a Lissajous scan pattern, or a raster scan mode in which it scans with consecutive scan lines along a first scan axis, and the consecutive scan lines are displaced relative to each other along a second perpendicular axis.

In accordance with this invention, one feature resides, briefly stated, in a reader for, and a method of, electro-optically reading coded indicia having parts of different light reflectivity, comprising a portable housing supportable on a finger of a user, and aimable by movement of the finger at an indicium to be read. A scan engine is supported by the housing and includes a scanner for scanning the indicium, and a decoder for generating a decoded, digital, data signal representing the indicium. A radio frequency transmitter is supported by the housing and is operative for transmitting the decoded, digital, data signal to a host remote from the reader by a low power, wireless, radio frequency, communications protocol.

In the preferred embodiment, the housing includes a light-transmissive window aimable by the finger movement at the indicium. The scan engine includes a source for directing a light beam through the window at the indicium for reflection therefrom, and a detector having a field of view and operative for detecting light reflected from the indicium and entering the housing through the window, and for generating an electrical analog signal corresponding to the indicium. The scanner is operative for scanning at least one of the light beam and the field of view in a scan over the indicium.

The transmitter may be activated by the host to initiate transmission. The transmitter transmits successive decoded, digital, data signals in time periods spaced timewise apart. A suitable wireless protocol is known as Bluetooth, Version 1.0, the specification of which can be found on the Internet at http:/www.bluetooth.com. This protocol utilizes little electrical energy, and conserves battery life.

According to another aspect of the present invention, the host is operative for receiving and processing the decoded, digital, data signal transmitted by the transmitter, and for generating an acknowledgment signal. An auditory annunciator is spaced apart from the reader and the host and is in wireless, radio frequency, communication with the host, for receiving the acknowledgment signal and, upon receipt thereof, for producing an acknowledgment sound audible to the user and indicative that the host received the decoded, digital, data signal. The annunciator is preferably worn by the user, for example, by being clipped on the user's clothing, or by being suspended from a neck strap.

The reader may, but need not, incorporate a scanner in which the light beam scans the indicia to be read. Alternatively, the light beam may be merely illuminating; in that case, the light detector may preferably be a CCD detector.

In a preferred embodiment, the reader incorporates or forms part of a ring which is desirably worn on an index finger of the user. To scan the indicia, the user points his or her index finger in the relevant direction. In some embodiments, an automatic scanning mechanism may be incorporated within the reader, so that the emitted beam automatically scans back and forth across the indicia (either in a two-dimensional scan or in a one-dimensional scan) even when the reader is held stationary. In other embodiments, however, no automatic scanning mechanism is provided, and the emitted light beam emerges in a fixed direction from the reader. In those embodiments, the user scans the beam across the indicia to be read by manually moving the reader, typically by moving his or her arm back and forth or by a twisting movement of the wrist.

Switching means may be provided for actuating the reader. Preferably, these may comprise a switch or button, attached to or forming part of the ring or part of a housing secured to the ring, whereby the user can operate the device merely by pressing the button with his or her thumb. This is particularly convenient when the reader is arranged to be worn on the index finger. Alternatively, a pull-cord may be provided which is secured to a second ring, arranged to be worn on a finger of the user's hand adjacent to the finger which is wearing the reader. By a suitable movement of the fingers, for example by flexing the second finger, the cord is pulled, thereby operating the device.

It will of course be understood that there are many other possibilities for actuating the device, including switch mechanisms which operate under voice control, and mechanisms which determine when the user's hand is being moved in a scanning motion.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 1A and 2B depict a portable system in accordance with a first embodiment of the present invention;

DETAILED DESCRIPTION OF THE PREFERRED EMBODIMENTS

Figure 1A:
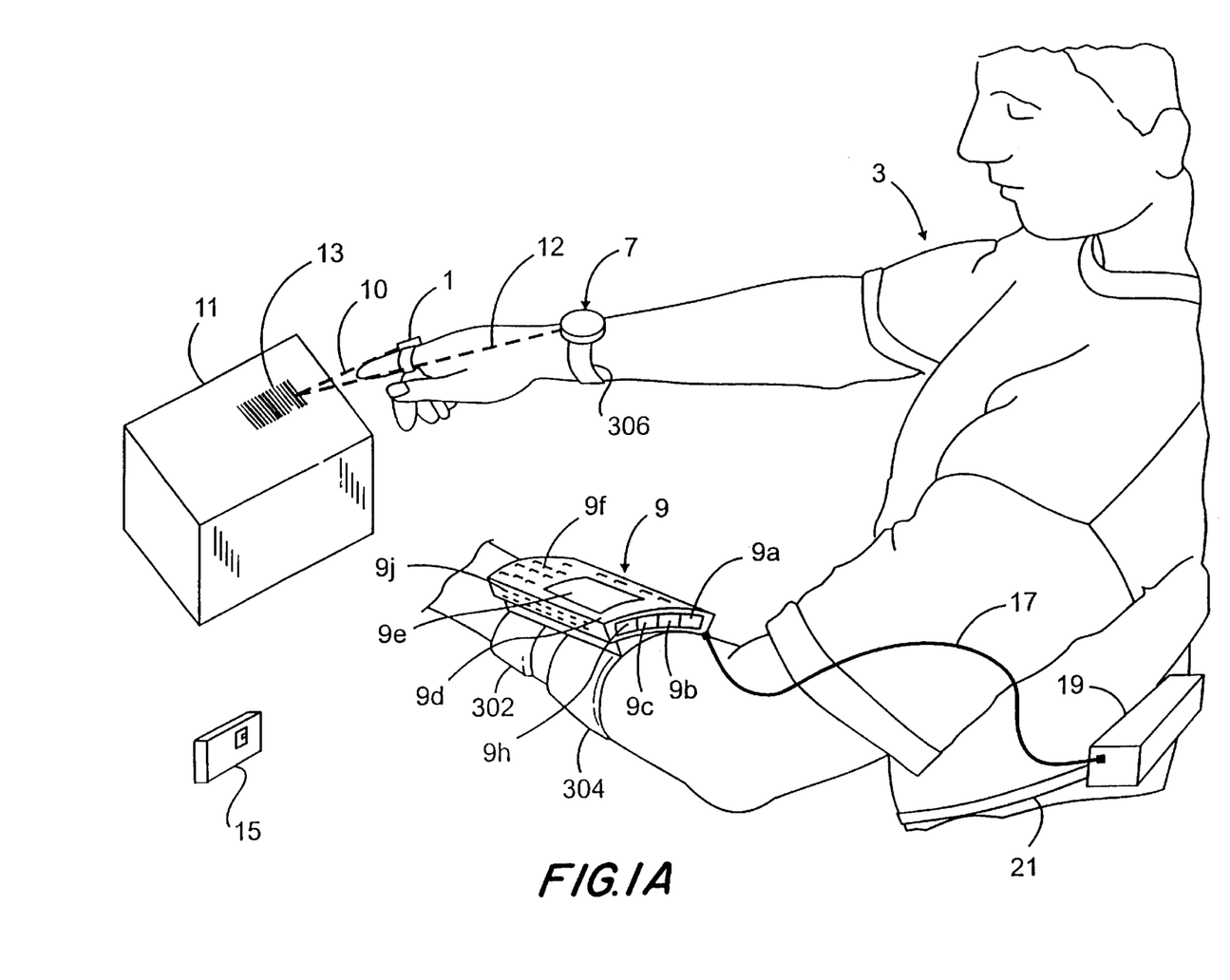

FIG. 1A shows a portable system in accordance with a first embodiment of the present invention. An optical scan module 1 is detachably mounted on a single finger of a user 3 using a ring-shaped mounting. The detachable mounting may be of any number of conventional types suitably adapted for its ease of use for the desired application. For example, a ball and flexible socket mounting, or a slide mounting could be used. Other mountings with movable restraining members might also be used.

In addition to the optical scan module 1, the user 3 wears a first peripheral module 7 on the wrist, and a second peripheral module 9 on the other arm. As will be clear from FIG. 1A, the scan module 1 emits a scanning laser beam 10 which the user directs towards a bar code symbol 13 to be read. The bar code symbol may be printed on or otherwise attached to an article 11, details of which the user 3 wishes to obtain, for example, for inventory or for sale purposes. The scanning beam 10 is reflected from the bar code symbol 13, and the reflected light 12 is detected by the first peripheral module 7.

Figure 1B:
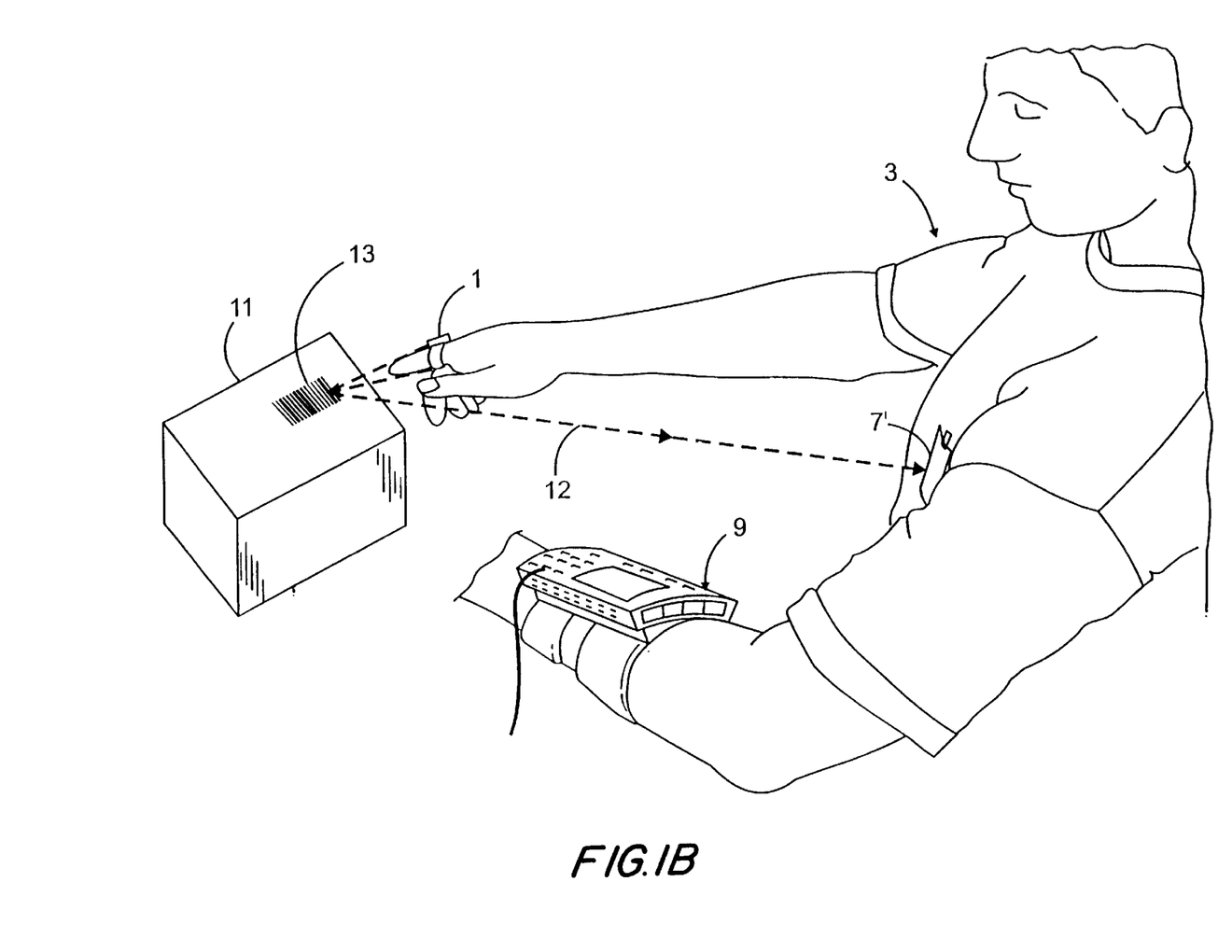

FIG. 1B illustrates a variant of the embodiment of FIG. 1A in which the reflected light 12 returning from the bar code symbol 13 is detected by a peripheral module 7' which is secured to the user's clothing. In the variant shown, the peripheral module comprises a detector which is clipped on to the breast pocket of the user's shirt or shift. Other arrangements (not shown) could of course be envisaged, in which the peripheral module 7' is secured to or forms part of other articles of clothing.

Figure 2:
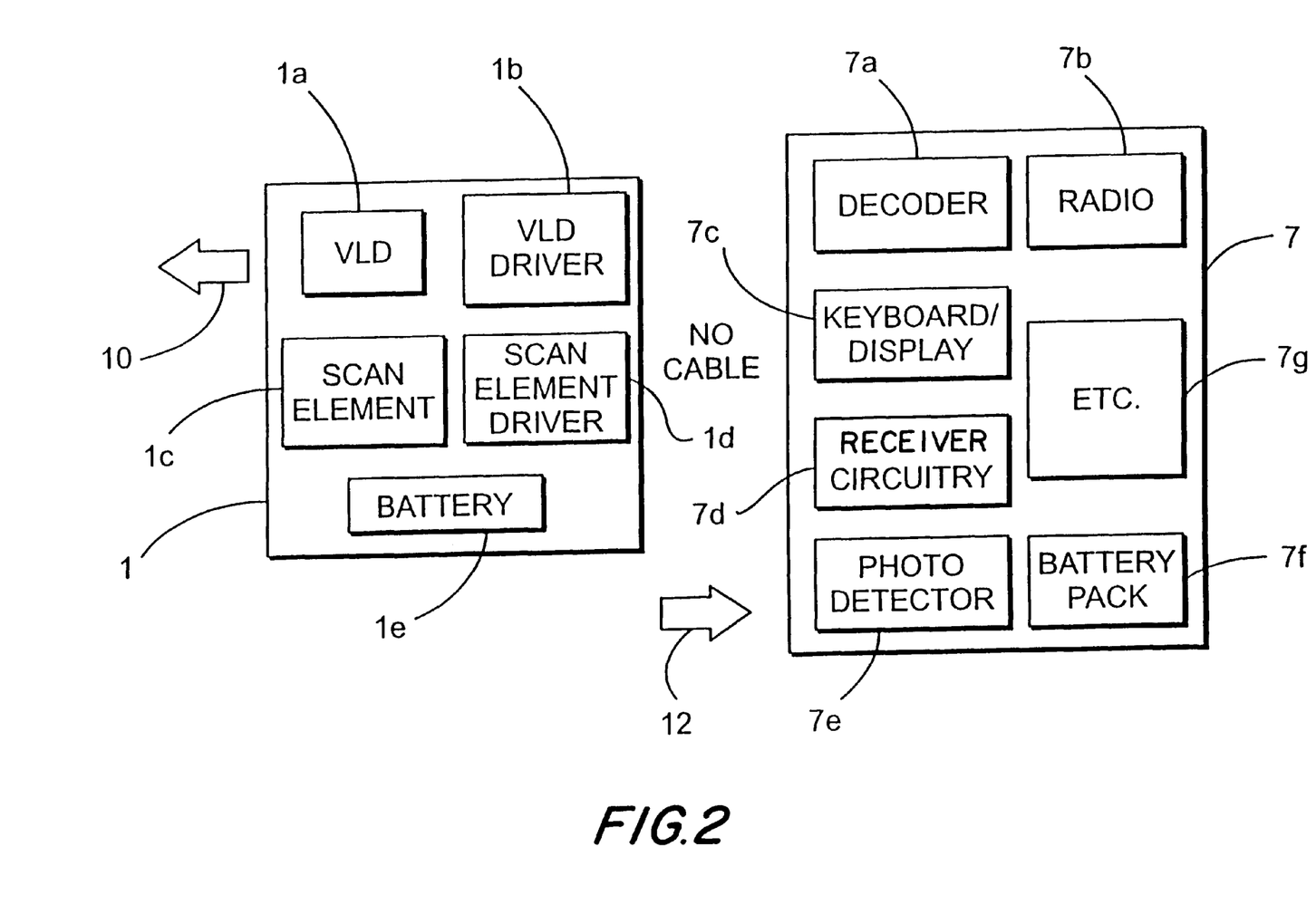
FIG. 2 illustrates schematically the ring unit and the wrist unit shown in FIGS. 1A and 1B.

FIG. 2 illustrates schematically the internal features of the scan module 1 and the first peripheral module 7. The module 1 incorporates a device for generating and scanning the light beam 10, desirably a visible laser diode (VLD) 1a having a driver 1b. Scanning of the beam 10 is achieved by means of a scan element 1c and a scan element driver 1d. Power is provided by means of a small battery 1e.

The first peripheral module 7 comprises a photodetector 7e and receiver circuitry 7d which are together arranged to detect the returning light beam 12. The output from the receiver circuitry is passed to a decoder 7a which is arranged to reconstitute the alphanumeric information which the bar code symbol 13 represents. The first peripheral module may also include a keyboard and/or display 7c along with other possible features 7g such as, for example, a time display so that the module 7 doubles as an ordinary watch when it is not in use as part of the optical scan system. A radio frequency (RF) or other wireless transmitter 7b, along with a battery pack 7f or other power supply, completes the unit.

In use, the decoded information emanating from the decoder 7a is passed by wireless link from the radio 7b to the second peripheral module 9 which is located on the other arm or wrist of the user. The radio transmitter 7b could be a transceiver which is also capable of receiving signals from the second peripheral module 9 or from a separate base station 15.

The second peripheral module 9 incorporates a radio receiver 9a and a radio transmitter 9b for communicating with the first module 7 and/or with the base unit 15. Typically, the respective transmission frequencies will be different. The second peripheral module 9 further includes digitizing and processing circuits 9c which convert the transmitted analog signal to a digital signal and decode the signal in a conventional manner. An indicator light, beeper or audio transducer 9d signals the user when the decoding has been satisfactorily accomplished. Such notice could also or alternatively be provided by information displayed on a display unit 9e. A memory storage device 9h is also preferably included for temporary storage of the decoded data. A keypad 9f and/or touch screen may be used for inputting data to the system. A battery 9j is provided to supply power to the secondary peripheral module. Alternatively, or in addition, power may be supplied via an external lead 17 from a separate power supply 19 which is secured to the body of the user, for example on a belt 21.

Depending upon the preference of the user, the second peripheral module could be worn on the right arm, or wrist, like a watch (and in fact, may function as a watch) and the optical scan module 1 and the first peripheral module on the left. In an alternative embodiment (not shown) the second peripheral module 9 could be dispensed with, and all the features of that unit instead being incorporated within the first peripheral module 7. This would, of course, be expected to make the first peripheral module rather larger than is shown in the drawing.

It will be noted that in the arrangement shown in FIGS. 1A and 1B, there is no cable or other physical connection between the optical scan module 1 and either of the first or second peripheral modules. This improves the wearability of system, and the likely user acceptance. It is also rather safer, since the lack of wires means that there is less to get caught as the user moves around, perhaps undertaking a variety of different tasks while wearing the devices shown.

In a variation of the embodiment described above, the scan element 1c and the scan element driver 1d may be omitted from the optical scan module 1, so that the beam 10 is essentially a fixed beam. With such an arrangement, the user would then physically move his or her hand or arm, thereby manually scanning the beam 10 across the bar code symbol 13. Such an arrangement has the advantage that the module 1 can be reduced in size and in weight, not only by elimination of the mechanical and electronic scanning features, but also because the battery 1e may substantially be reduced in size. A suitable module for use with this variation is described in more detail below.

Figure 3:
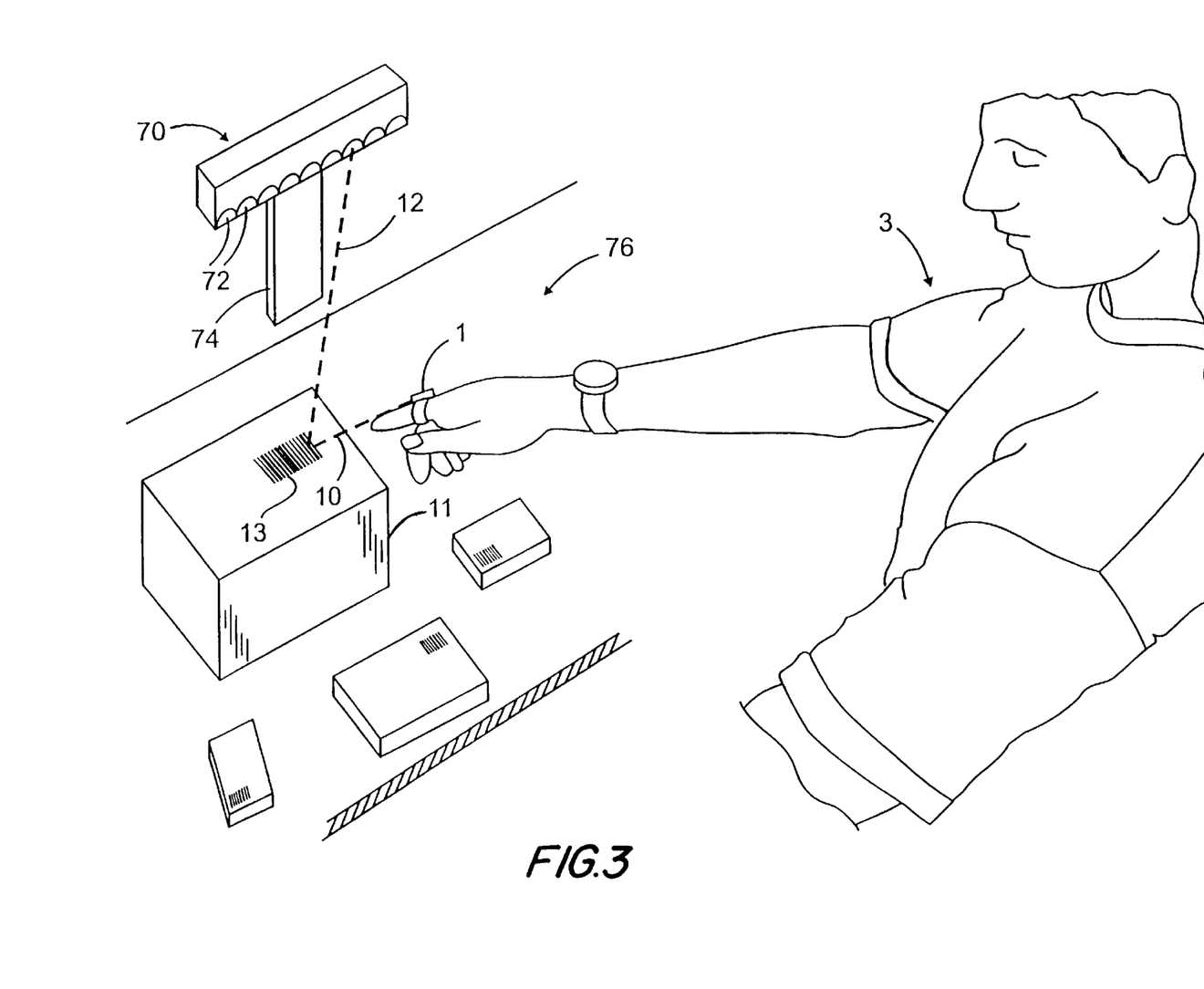
FIG. 3 depicts a portable system in accordance with a second embodiment of the present invention.

A second embodiment of the invention is shown schematically in FIG. 3. In this embodiment, the light 12 which is reflected from the bar code symbol 13 is detected by a separate detector unit 70 which comprises a fixed bank of photodetectors 72 which look down on the surface of the article 11 so as to detect the reflected light. The detector unit could be mounted to a stand 74 which is positioned adjacent a conveyor 76 along which the item 11 is passing. Alternatively, the detector unit 70 could be mounted in or secured to a cash register, could be mounted to the ceiling, or may be suspended from the ceiling by a cable similar to a hanging lamp, or could be mounted within a tunnel which surrounds or at least partially surrounds the conveyor.

In this embodiment, the optical scan module 1 is preferably the same as the scan module illustrated in FIGS. 1A, 1B and 2, with or without the scan element 1c and the scan element driver 1d. If these are not provided within the module, the user has to manually scan the beam 10 across the bar code symbol 13 to be read. As a further alternative (not shown) a hand held scanner could instead be used, but in each case the detectors are fixedly mounted over the scanned surface.

Figure 4:
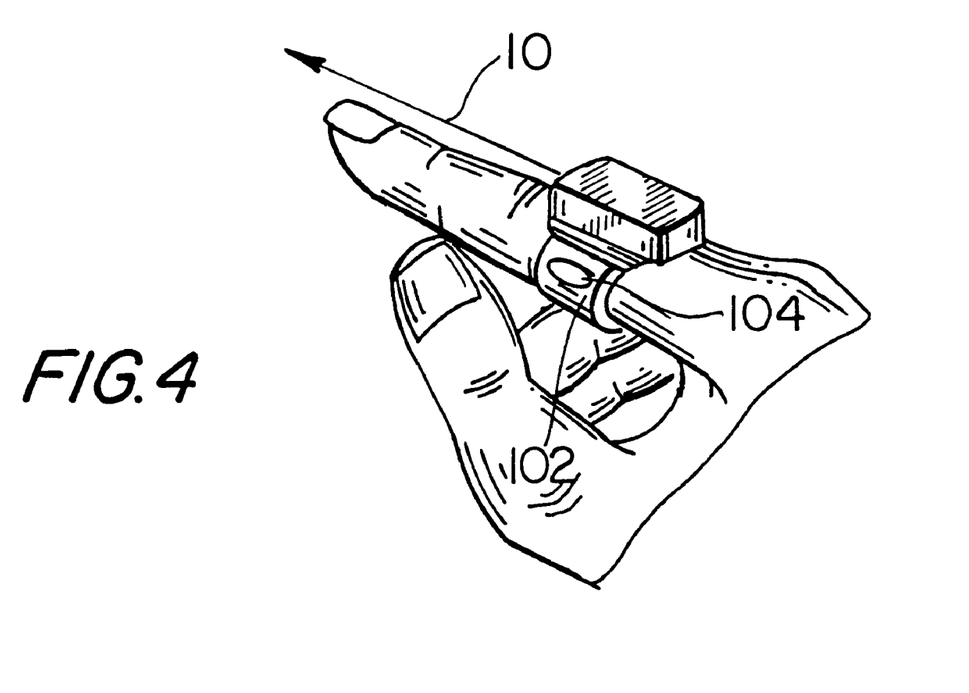
FIGS. 4 and 5 illustrate triggering mechanisms which may be used with the systems of FIGS. 1A, 1B, 2 or 3.
Figure 5:
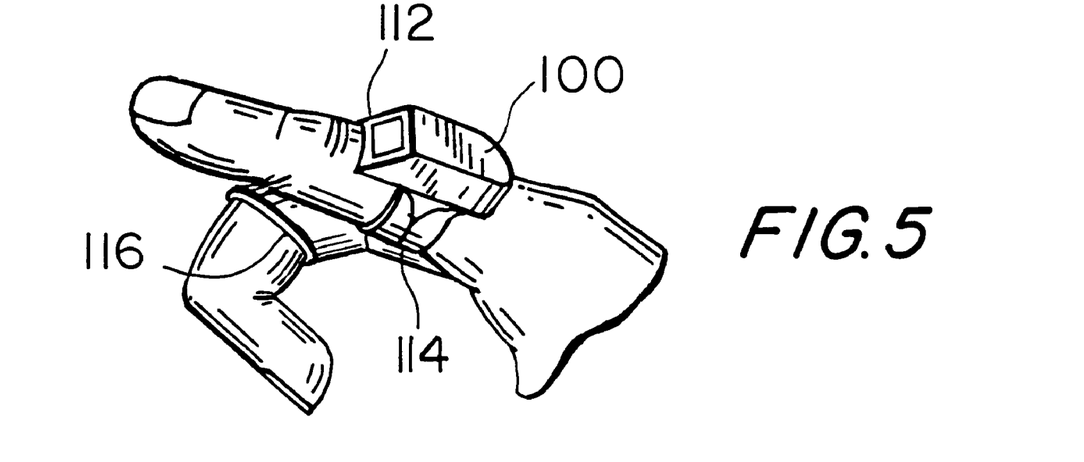

Reference should now be made to FIGS. 4 and 5 which illustrate certain preferred features of a ring-mounted reader. The reader comprises a ring or shank portion 102, adapted to be worn on the finger of the user, to which is secured an upper housing portion 100. Within the housing portion is a battery which provides power to a visible laser diode (VLD) or other light source. The VLD is mounted to a metal holder/heat sink. Light generated from the VLD passes through an optical system comprising a plurality of lenses, out through an exit window 112. The optical system preferably provides that the beam 10 is collimated or at least quasi-collimated. Electronic circuitry is provided which maintains the laser output at a predetermined level, and also acts as a trigger mechanism.

A trigger button 104 is provided on one side of the ring shank 102, where it can be actuated by the user's thumb. In this way, the user can easily switch the laser beam on and off, or actuate the scanning.

Another alternative and/or additional switching mechanism may be provided by means of a separate ring 116 which is attached to the user's middle finger and which is secured to the ring shank 102 by means of a cord 114. As is shown in FIG. 5, the user may operate the device by flexing the middle finger, and so pulling on the cord. This could be done either by bending the middle finger with respect to the index finger, or by pulling the middle finger away from the index finger.

A device of this sort is both easy and convenient for the user to wear, and it also allows free use of the hand at all times. Because the ring is preferably mounted to the index or forefinger, pointing accuracy is likely to be increased.

An alternative and/or additional switching mechanism may be provided by the use of a limited range proximity sensor located on the front or side surface of the ring shank 102. When the user wishes to turn the unit on, a slight movement of the thumb closer to the index finger will switch the unit on, thus avoiding the effort required for the thumb to press a trigger switch.

Batteries for wearable devices of the types which have already been described typically occupy a significant proportion of the device's volume, and additionally contribute to its weight. Where substantial power is required, such as for example the devices illustrated in FIGS. 1–5, a separate battery pack 19 is often the most convenient way to provide the power that is needed. However, in a variation of the embodiments previously described, power may instead or in addition be provided by a thin flexible battery which forms part of the band that wraps around the arm, wrist or finger of the user. Specifically, in FIG. 1A the wrist band 306 could be such a battery, as could be the arm bands 302, 304. In FIG. 5, the ring shank 102 could be a battery.

Preferably, the battery is of the lithium polymer rechargeable type, which is simply cut into the appropriate shape. Such batteries may provide sufficient power, on their own, for operation of some devices; in other cases, they may be used as an auxiliary battery, thereby reducing the size of the additional cells that may be necessary.

Figure 6:
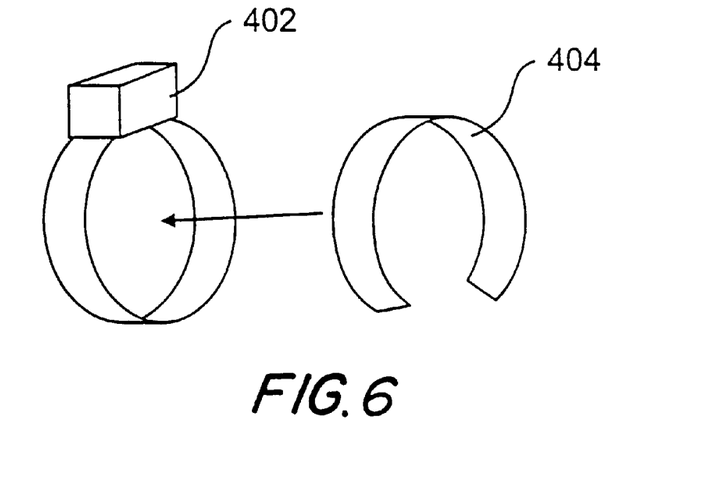
FIG. 6 shows schematically yet a further embodiment in which a band for securing a scanner to the user's body comprises a flexible battery.

FIG. 6 illustrates the concept in schematic form. A flexible battery strip 404, preferably a lithium polymer battery, is formed into a ring shape and is attached to a scanner 402. Depending upon the size of the device, the band 404 may fit around a finger, a wrist or an arm of the user.

Figure 7:
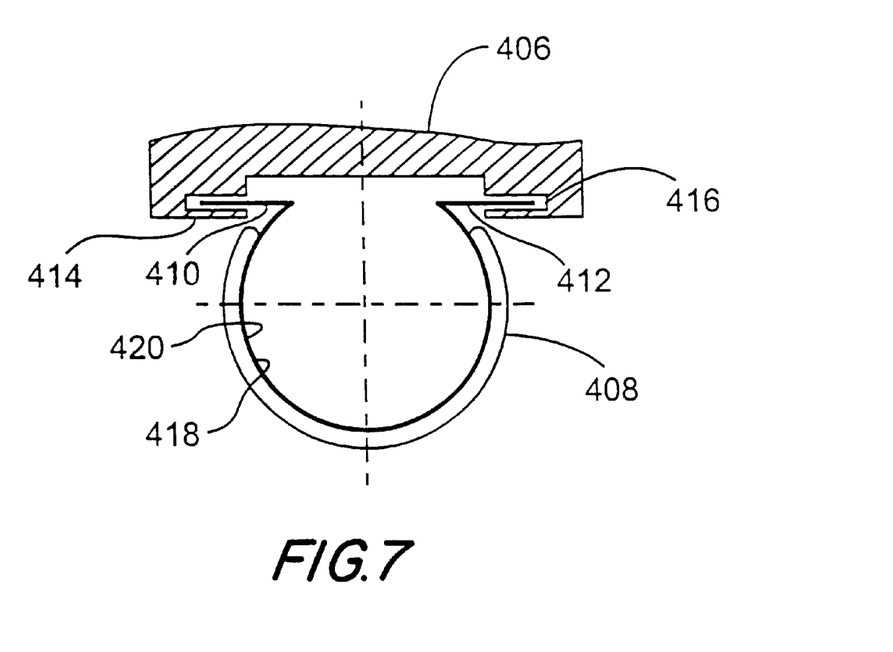
FIG. 7 represents a practical embodiment of the device shown in FIG. 6.

FIG. 7 illustrates a practical embodiment in more detail. A flexible battery strip 408 is attached to two circularly-shaped snap springs 418, 420. One snap spring 418 is attached to the positive battery terminal, and the other 420 to the negative battery terminal. At one end of the spring 418 there is a contact portion 410, while at the opposite end of the other spring 420 there is a similar contact portion 412. These fit into corresponding grooves 414, 416 in the lower surface of the scanner 406, thereby providing the necessary electrical power.

The exact shape and configuration of the battery and the contacts is not of course critical. In the embodiment shown in FIG. 7, the springs 418, 420 could be in the form of thin, sprung wires. Alternatively, they could take the form of flat leaf springs, which extend out of the plane of the figure. In the first case, the scanner 406 is provided with sockets 414, 416 in the form of blind bores which receive the contact portions 410, 412. Alternatively, where the springs take the form of leaf springs, the contact portions 410, 412 may simply be slid into appropriate grooves 414, 416 in a direction perpendicular to the plane of the figure. In either case, the snap springs 418, 412 are preferably incorporated within the plastic protective jacket of the battery during the manufacturing process.

To make it easier to put the device on and to take it off, an alternative embodiment (not shown) provides for one end of the battery to be hinged to the underside of the scanner. The other end is secured by an easily-releasable clasp. To put the device on, or to take it off, the user merely releases the clasp and hinges the battery away from the underside of the scanner.

Figure 8:
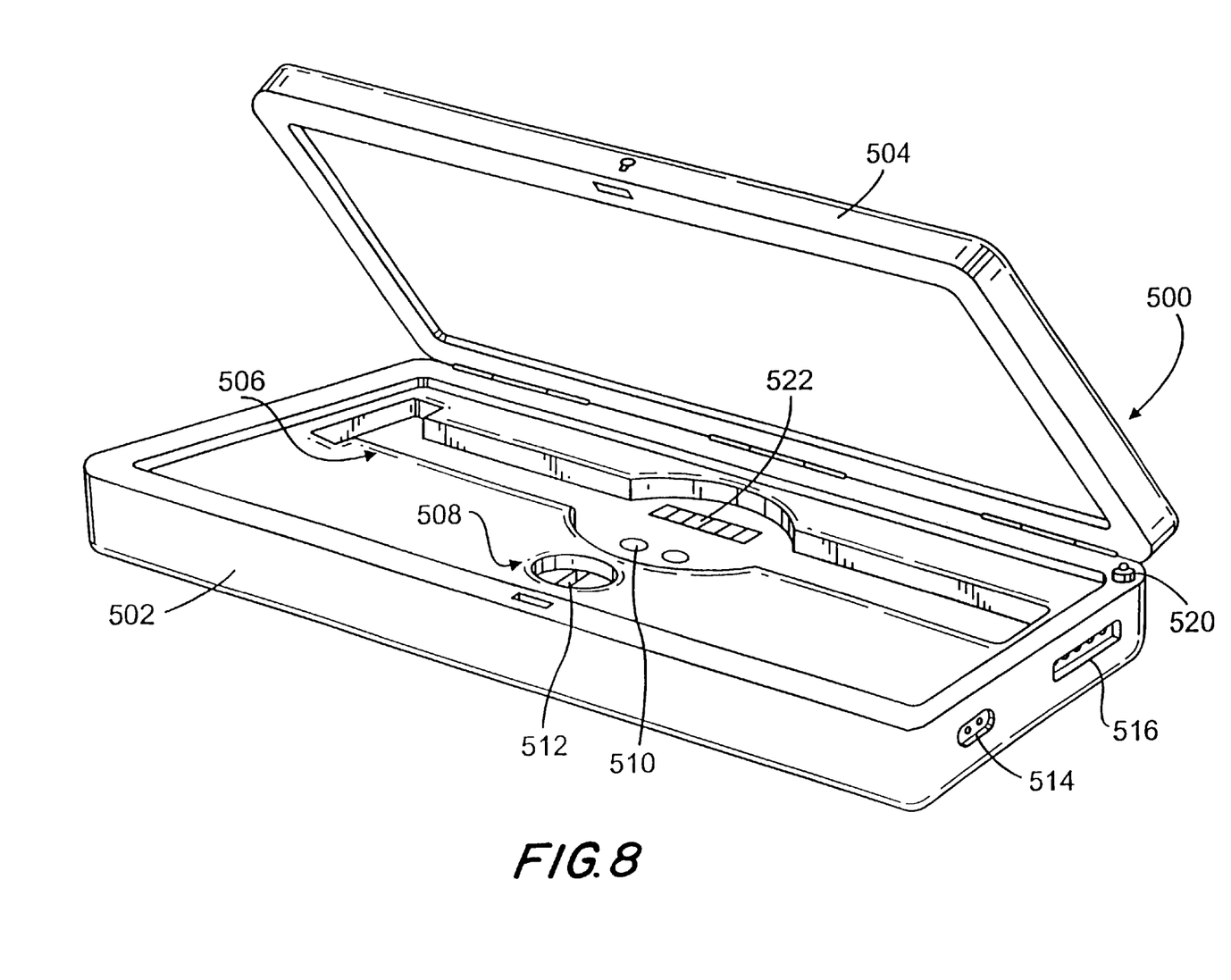
FIG. 8 shows a storage box for use with the portable optical scan system of FIGS. 1A, 1B.

FIG. 8 shows a storage box 500 which is suitable for use with the system shown in FIG. 1A. The box comprises a base portion 502 and a lockable hinged lid portion 504. Within the base portion 502 there is a first recess 506 for storing the watch 7 (FIG. 1A) and a second recess 508 for storing the ring 1 (also FIG. 1A). In addition to providing convenient and secure storage, the box 500 incorporates a battery charger (not shown) to recharge any battery that may be incorporated within the watch 7 and/or the ring 1. To that end, when the watch is placed within the recess 506, its rear surface comes into contact with electrodes 510. Likewise, when the ring is placed in the recess 508, with the band portion pushed down into a slot 512, it comes into contact with further electrodes (not shown). Power is provided to these electrodes via a mains supply which is plugged into a socket 514 on the outside of the box. The electrodes become live, thereby recharging the batteries (for example, overnight) when the lid 504 is closed, thereby closing a microswitch 520.

In some embodiments, the watch 7 of FIG. 1A may be used to store data, and may accordingly have a memory chip inside it. When the watch is placed in the recess 506, an electrical contact on its rear surface abuts a corresponding contact 522 at the base of the recess. The data within the watch may then automatically be downloaded, or downloaded on request, via a data socket 516 to an external computer (not shown).

Figure 9:
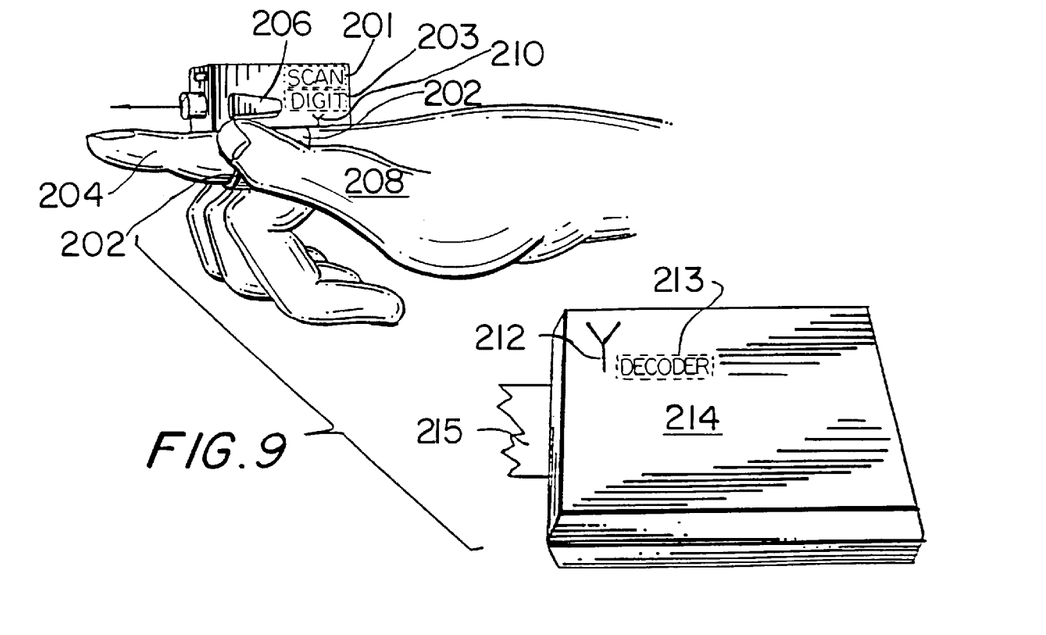
FIG. 9 illustrates an arrangement wherein a miniature reader is mounted on the index finger of an operator, and the electronics in the reader communicates by a short range radio transmitter with a receiver which might typically be mounted on the belt of the operator.

FIG. 9 illustrates an arrangement wherein a miniature scanner 201 as disclosed herein for a bar code reader is mounted within a housing 200 supported on an index ring mounting 202 on the index finger 204 of a user. A trigger switch 206 is provided on the side of the housing 200 which is activated by the user's thumb 208 to actuate the scanner 201. The electronics in the bar code reader communicates the data it has acquired by a short range radio transmitter 210 in the housing 200 to broadcast to an antenna 212 of a receiver in an associated control unit 214, which might typically be mounted on the belt 215 of the user. The control unit 214 in the second housing typically would include a display, a keyboard, or a touch screen functioning as a display/keyboard, similar to that illustrated in FIG. 10. In an alternative embodiment, the scanner could be voice activated with a voice recognition means installed in either the housing 200 or the control unit 214.

A typical prior art bar code reader includes a bar code scanner, a signal digitizer, and a decoder. The bar code scanner generates a light beam directed toward a symbol to be read on a target and receives reflected light from the symbol to produce an analog electrical signal corresponding to the intensity of the reflected light. The signal digitizer includes a signal processor for processing the analog electrical signal to generate therefrom a digitized signal descriptive of the bar code symbol. The decoder decodes or translates the digitized signal into data represented by the symbol.

In the embodiment of FIG. 9, the finger-mounted housing 20 includes therein the bar code scanner 203 for producing an analog electrical signal and a signal digitizer 203 for generating therefrom a digitized signal descriptive of the bar code symbol. The digitized signal is then transmitted by radio transmission to a decoder 213 located in the control unit 214.

Figure 10:
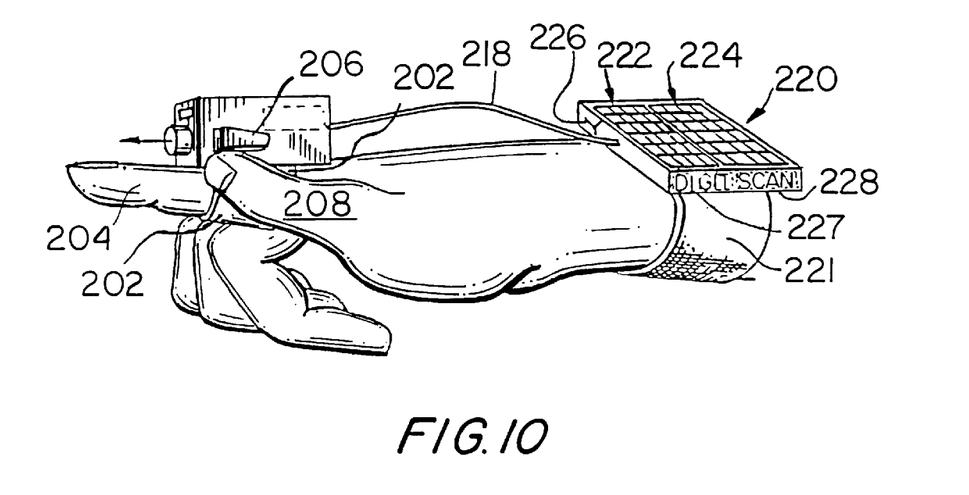
FIG. 10 illustrates an arrangement similar to FIG. 9 wherein a miniature reader is mounted on the index finger of an operator, and the electronics in the bar code reader communicates by a wire with a portable terminal mounted on a wrist band on the wrist of the operator.

FIG. 10 illustrates an arrangement similar to FIG. 9 wherein a miniature scanner 201 as disclosed herein for a bar code reader is mounted within a housing 200 supported on an index ring mounting 202 on the index finger 204 of a user. A trigger switch 206 is provided on the side of the housing 200 which is activated by the user's thumb 208, or alternatively a voice activated arrangement could be utilized therein. The electronics in the bar code reader communicates the analog signal produced by the scanner 201 by a wire 218 with a portable control terminal 220 mounted on a wrist band 221 in a wristwatch like manner on the wrist of the user. The portable terminal 220 typically includes an LED display 222, an array 224 of entry keys, and an antenna 226 for communicating with a central computer. The analog signal on wire 218 is directed to a signal digitizer 227 located in the control terminal 220 which digitizes the analog signal, and the output digitized signal therefrom is directed to a decoder 228 also located in the control terminal 220. The output of the decoder, which is data represented by the scanned bar code symbol, is then transmitted by antenna 226 to the central computer. Accordingly, the embodiment of FIG. 10 also differs from the embodiment of FIG. 9 by placing the digitizer 227 in the associated control terminal 220 rather than in the housing 200.

Figures 11, 12, 13:
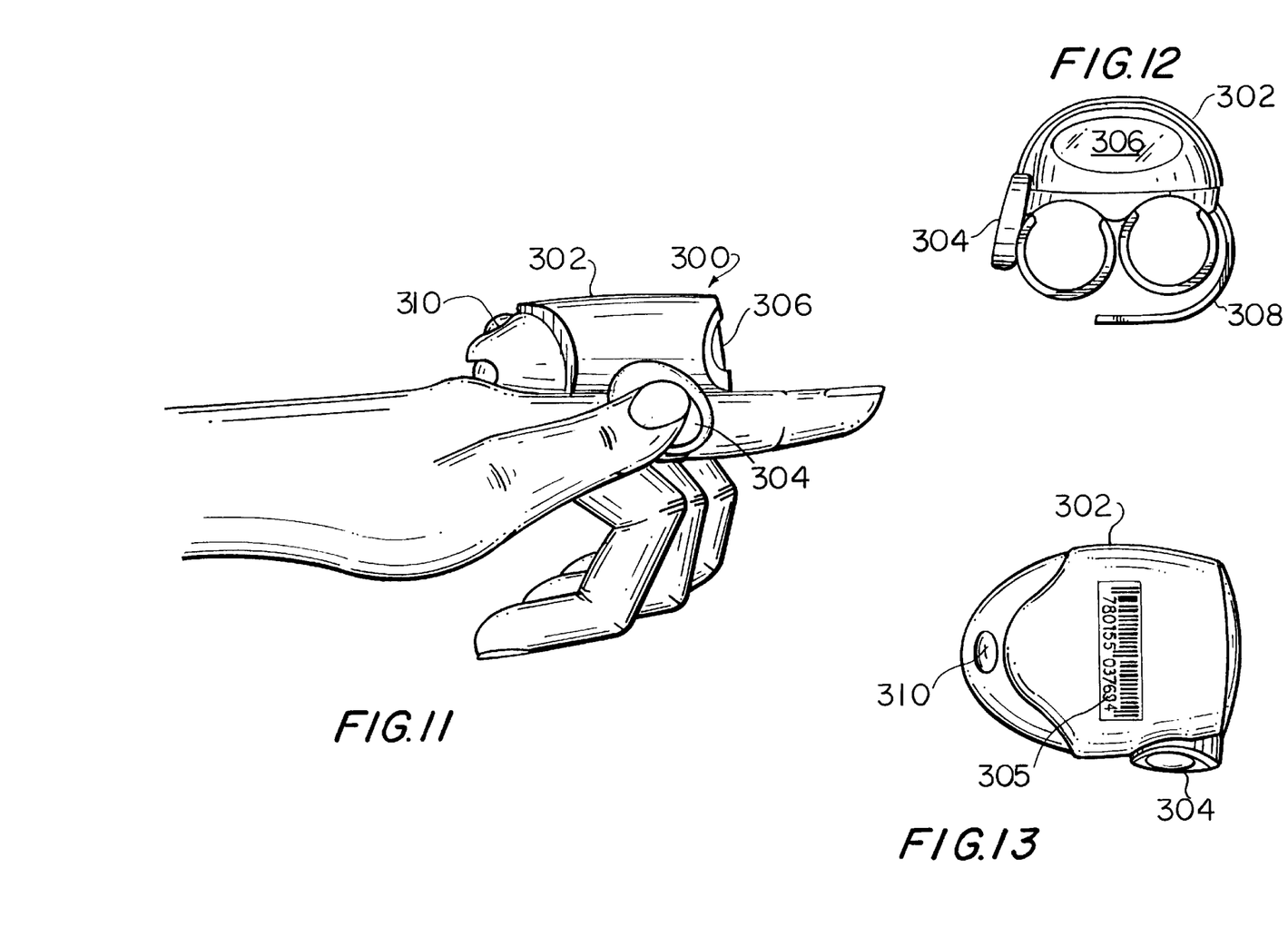
FIG. 11 illustrates another embodiment of a finger-mounted reader.
FIG. 12 is a front view of the reader embodiment of FIG. 11.
FIG. 13 is a top plan view of the reader embodiment of FIG. 11.

FIG. 11 illustrates a miniature reader 300 having a housing 302 supported on at least one finger and, as depicted, two fingers, of a user. A trigger 304 on the side of the housing is activated by the user's thumb to initiate scanning. A light-transmissive window 306 is mounted on the housing and faces a symbol to be read. A strap 308 is guided through belt guides to at least partially encircle two of the user's fingers. The housing depicted in FIGS. 11–13 has a low profile and a low center of gravity.

The rear of the housing has a release 310 which, when depressed, disengages a rear housing section, thereby enabling battery replacement and/or recharging. The replaceable battery can be small and hold a limited capacity charge for short-term use, or can be large and hold an extended capacity charge for long-term use. Although not illustrated, a keyboard and/or a display could be provided on the top wall of the housing. A voice recognition circuit could also be provided. A bar code symbol 305 identifying the identity or serial number of the reader 300 is provided on the housing.

Figure 14:
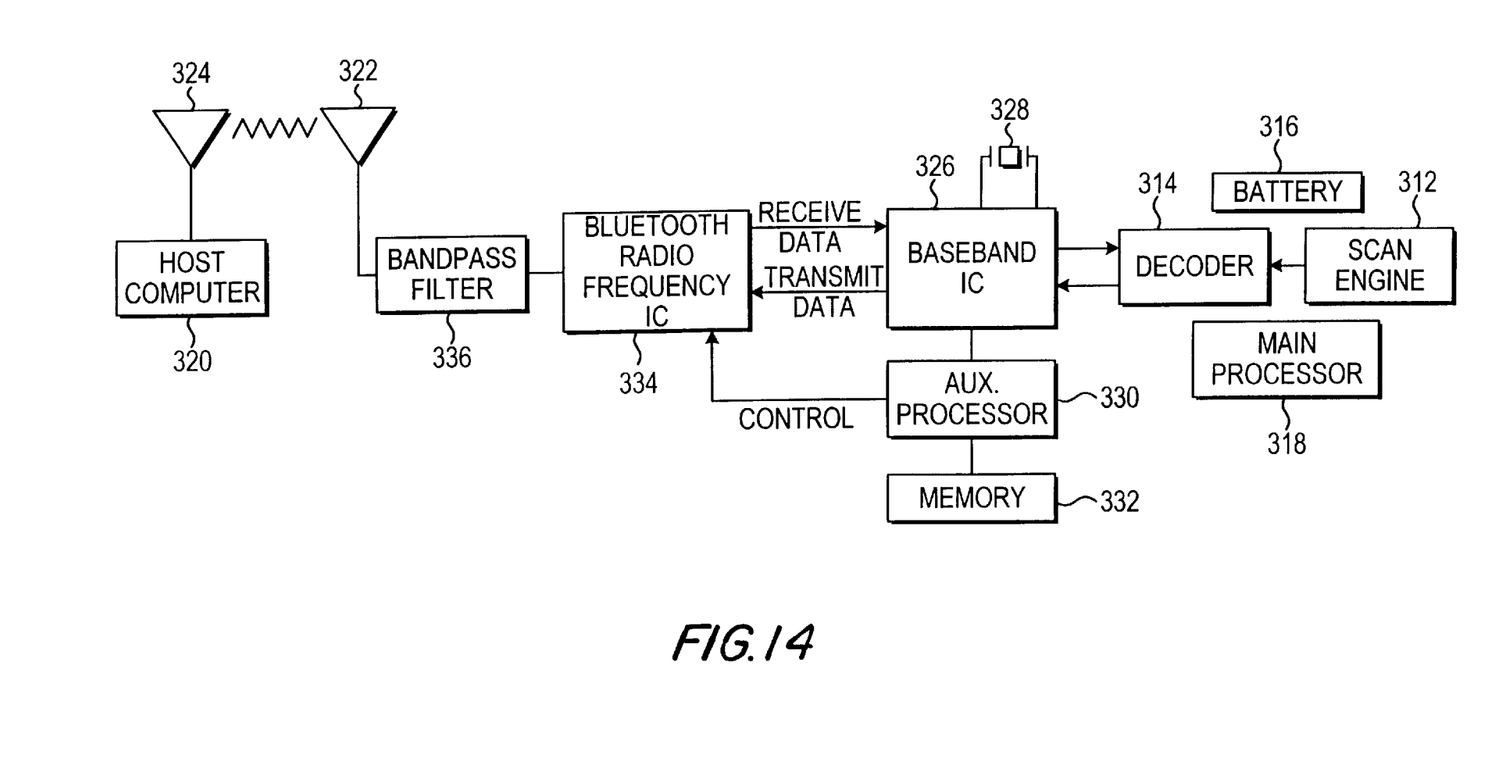
FIG. 14 is a block diagram of the electronic circuitry employed in the reader of FIG. 11.

As depicted in FIG. 14, the electronic components onboard the reader 30 include a scan engine 312 which includes a light source for generating a light beam; optics for directing and focusing the beam through the window 306 to a symbol for reflecting therefrom; a sensor for receiving reflected light from the symbol and entering the reader through the window 306, and for producing an analog electrical signal corresponding to the intensity of the reflected light; a scanner for sweeping the light beam across the symbol and/or for scanning a field of view of the sensor; and a digitizer for processing the analog signal to obtain a digitized signal descriptive of the symbol.

The reader further includes a decoder 314 within the housing 302, and operative for decoding or translating the digitized signal from the scan engine into a decoded digital data signal representing the symbol. A battery 316 supplies electrical power, and is preferably rechargeable. A main processor 318 controls the operation of the scan engine and the decoder.

This invention further proposes transmitting the data signal away from the finger-mounted scanner 300 to a remote host 320, such as a computer, by radio frequency wireless transmission between reader antenna 322 and host antenna 324 via a low power communications protocol, such as the Bluetooth or the Aloha protocols, which minimize energy expenditure by the onboard battery 316. FIG. 14 depicts a suitable transmitter circuit comprising a baseband integrated circuit 326 having a low power crystal oscillator 328, and controlled by an auxiliary processor 330 connected to a memory 332.

The baseband circuit 326 is in bidirectional communication with a radio frequency integrated circuit 334, for example, one controlled by the auxiliary processor 330 to function in accordance with the standards of the Bluetooth protocol. The radio frequency circuit 334 is connected to the reader antenna 322 via a bandpass filter 336 to remove noise.

In the preferred embodiment, the components 326–336 are mounted on a single printed circuit board; and the decoder 314 and the processor 318 are mounted on a printed circuit board on the scan engine.

Figure 15:
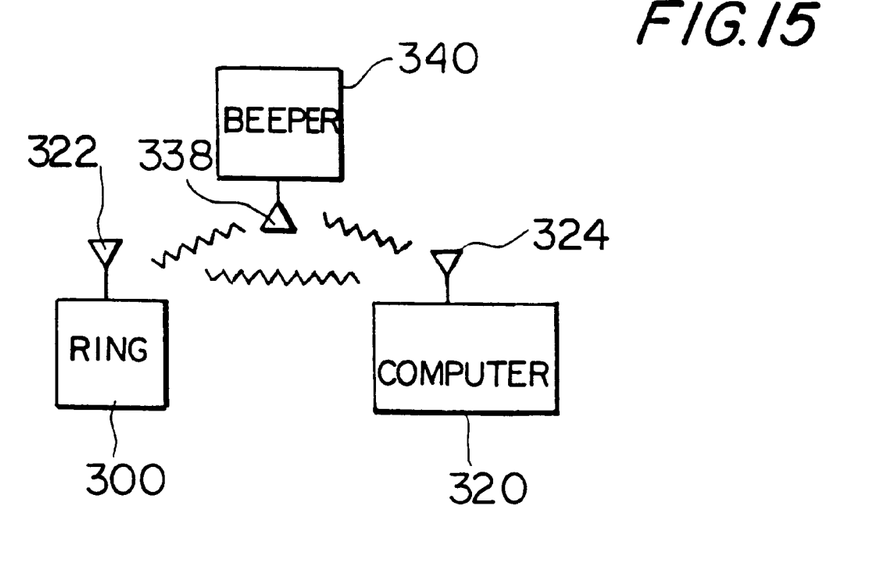
FIG. 15 is a block diagram depicting the communication among the reader of FIG. 11, a host and a beeper.

The transmitted data signal is received by the host antenna 324 where it is processed by the host 320. For example, the host may refer to a look-up table in which an attribute, for example, a purchase price, of a product identified by the symbol, is retrieved. The host may also develop a customer buying profile in which the products purchased at a retail site are catalogued.

Upon receipt of the transmitted data signal, the host generates an acknowledgment signal and transmits the same by radio frequency, wireless transmission to a remote annunciator 340 having an annunciator antenna 338. The annunciator 340 generates an audible sound, for example, a beep to signify that the transmitted data signal was indeed received by the host. The sound can be a single tone or multiple tones. The annunciator could general a visible display, such as a light being illuminated.

Figure 16:
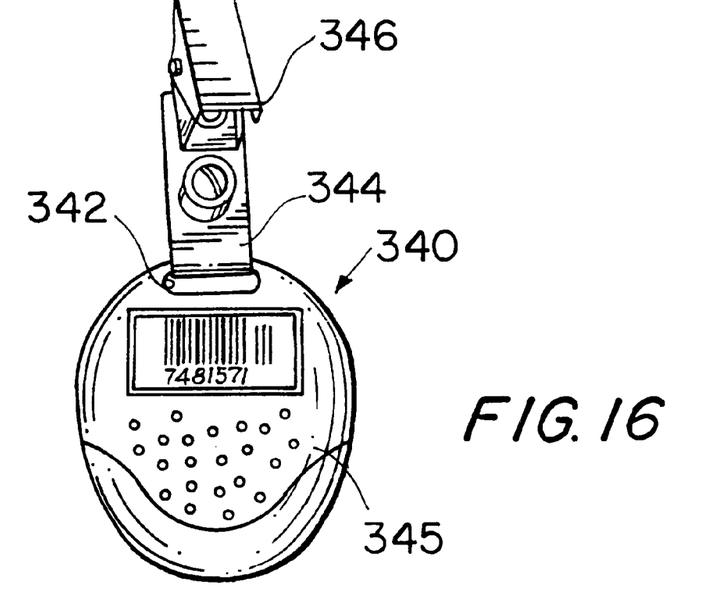
FIG. 16 is a perspective view of the beeper used with the reader embodiment of FIG. 11.

The annunciator or beeper 340 is also remotely located from the reader 300, but is within earshot of the user. Preferably, as shown in FIG. 16, the beeper includes a casing having a mounting aperture 342 through which a strap 344 having a clip 346 is passed. The clip 346 is spring-biased and can be clipped onto the user's clothing, particularly a pocket. A necklace can similarly be passed through the aperture 342 to enable the beeper to be suspended from the user's neck.

It is known in the art to generate onboard the reader itself a beep signifying that a symbol has been successfully read, or that an error occurred during reading. When a reader is operated in a noisy environment, it is known to generate a beep in excess of 85dB which simply increases the overall noise level.

In accordance with this invention, the radio frequency transmission of any acknowledgment sound to a remote device is novel and, more particularly, the transmission of a beep signifying that a remote host has received a transmitted data signal is also novel. The mounting of the beeper on one's clothing, or around the neck, positions the beeper closer to the user's ear and, therefore, a loud beep need no longer be generated, and the environment can be made less noisy.

The beeper could also be implemented in an earphone, a helmet or a hat, or in a headset having an earphone and a microphone for bidirectional communication.

A bar code symbol 345 identifying the identity or serial number of the beeper 340 is provided on the casing. It will be recalled that the reader 300 and the beeper 340 are separate devices in radio frequency communication with each other and with the host computer 320. Since the host computer may, and frequently does, receive a data signal from more than one reader, and since the host computer may, and frequently does, transmit an acknowledgment signal to more than one beeper, it is necessary to associate each beeper with a respective reader so that the beep will correspond to the active reader. By way of example, a point-of-transaction site may have one reader and one or more beepers, or may have multiple readers and one or more beepers.

In order to associate a beeper with a reader, a set-up mode is established whereby the reader reads the beeper symbol 345 and stores the identity or serial number of the beeper in memory within the reader. The identity or serial number of the reader, as exemplified by the reader symbol 305, is already stored in the memory. Thereupon, in an operating mode, when the reader transmits the data signal to the host computer, the identities of the associated beeper and of the reader are transmitted so that the host computer now knows to which beeper the acknowledgment signal should be sent.

The aforementioned Bluetooth and Aloha protocols conserve energy usage by not being continuously powered. For example, under the Bluetooth protocol, the transmitter in the finger-mounted reader can be inactive for a period of time, for example, a minute, and then can wake up for a certain interval, for example, two seconds to transmit the data signal. Alternatively, the transmitter can wake up every one-half second to transmit the data signal. Also, the host computer can poll the transmitter every interval to wake up the transmitter.

Under the Aloha protocol, there is no polling. The transmitter automatically downloads the data signal to the host after scanning, and waits for an acknowledgment. Otherwise, the transmitter stays inactive.

Another key feature of the present invention is to implement a variety of adaptable "self triggering" or "object sensing" modes of operation that eliminate the need for a manual trigger switch, and also optimize the turning on of the scanning and bar code reading operation for different ergonomic implementations—fixed mount, hand-held (including hand-supported), ring or finger-mounted, body mounted, etc., all of which may require different "turn on" conditions for the user applications envisioned. Reference is made to U.S. Pat. No. 5,280,162 for background information describing a scanning system operable in a "sleep" mode including object sensing, and a "scanning" mode after sensing an object in the scanning field.

Although the present invention has been described with respect to reading bar codes including stacked, or two dimensional bar codes such as Code 49, PDF 417 and similar symbologies, it is conceivable that the method of the present invention may also find applications for use with various machine vision or optical character recognition applications in which information is derived from other types of indicia such as characters or from the surface characteristics of the article being scanned.

In all of the various embodiments, the elements of the scanner may be assembled into a very compact package that allows the entire scanner to be fabricated as a single printed circuit board or integral module. Such a module can interchangeably be used as the laser scanning element for a variety of different types of data acquisition systems. For example, the module may be alternately used in a ring, hand-held or body-mounted scanner, a table top scanner attached to a flexible arm or mounting extending over the surface of the table or attached to the underside of the table top, or mounted as a subcomponent or subassembly of a more sophisticated data acquisition system. Control or data lines associated with such components may be connected to an electrical connector mounted on the edge or external surface of the module to enable the module to be electrically connected to a mating connector associated with other elements of a data acquisition system.

An individual module may have specific scanning or decoding characteristics associated with it, e.g., operability at a certain working distance, or operability with a specific symbology or printing density. The characteristics may also be defined through software or by the manual setting of control switches associated with the module. The user may also adapt the data acquisition system to scan different types of articles or the system may be adapted for different applications by interchanging modules on the data acquisition system through the use of a simple electrical connector.

The scanning module described above may also be implemented within a self-contained data acquisition system including one or more such components as keyboard, display, printer, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a portable or stationary receiver or base station.

It will be understood that each of the elements described above, or two or more together, also may find a useful application in other types of scanners and bar code readers differing from the types described above.

While the invention has been illustrated and described as embodied in finger-mounted readers with low power radio frequency communications, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

We claim:

1. A reader for electro-optically reading coded indicia having parts of different light reflectivity, comprising:
    a) a portable housing supportable on a finger of a user, and aimable by movement of the finger at an indicium to be read;
    b) a scan engine supported by the housing and including a scanner for scanning the indicium, and a decoder for generating a decoded, digital, data signal representing the indicium; and
    c) a radio frequency transmitter supported by the housing and operative for transmitting the decoded, digital, data signal to a host remote from the reader by a low power, wireless, radio frequency, communications protocol.

2. The reader of claim 1, wherein the housing includes a light-transmissive window aimable by the finger movement at the indicum; wherein the scan engine includes a source for directing a light beam through the window at the indicium for reflection therefrom, and a detector having a field of view and operative for detecting light reflected from the indicium and entering the housing through the window, and for generating an electrical analog signal corresponding to the indicium; and wherein the scanner is operative for scanning at least one of the light beam and the field of view in a scan over the indicium.

3. The reader of claim 2; and further comprising a trigger on the housing and manually actuatable to initiate reading.

4. The reader of claim 1, wherein the housing includes a strap for at least partially encircling the finger of the user.

5. The reader of claim 4, wherein the housing extends over, and is supportable on, two fingers of the user; and wherein the strap at least partially encircles the two fingers.

6. The reader of claim 1; and further comprising a power source supported by the housing, for supplying electrical power to the scan engine and the transmitter.

7. The reader of claim 1; and further comprising a memory supported by the housing, for storing the decoded, digital, data signal prior to transmission to the host.

8. The reader of claim 1, wherein the transmitter is activated by the host to initiate transmission.

9. The reader of claim 1, wherein the transmitter transmits successive decoded, digital, data signals in time periods spaced timewise apart.

10. A system for electro-optically reading coded indicia having parts of different light reflectivity, comprising:
    a) a portable reader supportable on a finger of a user, and aimable by movement of the finger at an indicium to be read; a scan engine supported by the reader and including a scanner for scanning the indicium, and a decoder for generating a decoded, digital, data signal representing the indicium; and a radio frequency transmitter supported by the reader and operative for transmitting the decoded, digital, data signal away from the reader by a low power, wireless, radio frequency, communications protocol;
    b) a host for receiving and processing the decoded, digital, data signal transmitted by the transmitter, and for generating an acknowledgment signal; and
    c) an auditory annunciator spaced apart from the reader and the host and in wireless, radio frequency, communication with the host, for receiving the acknowledgment signal and, upon receipt thereof, for producing an acknowledgment sound audible to the user and indicative that the host received the decoded, digital, data signal.

11. The system of claim 10, wherein the reader includes a light-transmissive window aimable by the finger movement at the indicium; wherein the scan engine includes a source for directing a light beam through the window at the indicium for reflection therefrom, and a detector having a field of view and operative for detecting light reflected from the indicium and entering the reader through the window, and for generating an electrical analog signal corresponding to the indicium; and wherein the scanner is operative for scanning at least one of the light beam and the field of view in a scan over the indicium.

12. The system of claim 11; and further comprising a trigger on the reader and manually actuatable to initiate reading.

13. The system of claim 10, wherein the reader includes a strap for at least partially encircling the finger of the user.

14. The system of claim 13, wherein the reader extends over, and is supportable on, two fingers of the user; and wherein the strap at least partially encircles the two fingers.

15. The system of claim 10; and further comprising a replaceable power source supported by the reader, for supplying electrical power to the scan engine and the transmitter.

16. The system of claim 10; and further comprising a memory supported by the reader, for storing the decoded, digital, data signal prior to transmission to the host.

17. The system of claim 10, wherein the transmitter is activated by the host to initiate transmission.

18. The system of claim 10, wherein the transmitter transmits successive decoded, digital, data signals in time periods spaced timewise apart.

19. The system of claim 10, wherein the annunciator includes a support for mounting the annunciator on the user.

20. The system of claim 19, wherein the support is a clip for clipping the annunciator to clothing worn by the user.

21. A method of electro-optically reading coded indicia having parts of different light reflectivity, comprising the steps of:
   a) supporting a portable housing on a finger of a user, and aiming the housing by movement of the finger at an indicium to be read;
   b) scanning the indicium, and generating a decoded, digital, data signal representing the indicium by actuating a scan engine supported by the housing; and
   c) transmitting the decoded, digital, data signal from the reader to a host remote from the reader by a low power, wireless, radio frequency, communications protocol.

22. A method of electro-optically reading coded indicia having parts of different light reflectivity, comprising the steps of:
   a) supporting a portable reader on a finger of a user, and aiming the reader by movement of the finger at an indicium to be read;
   b) scanning the indicium, and generating a decoded, digital, data signal representing the indicium;
   c) transmitting the decoded, digital, data signal away from the reader by a low power, wireless, radio frequency, communications protocol;
   d) receiving and processing the decoded, digital, data signal transmitted by the reader at a host remote from the reader, and generating an acknowledgment signal; and
   e) producing an acknowledgment sound audible to the user and indicative that the host received the decoded, digital, data signal.

23. A system for electro-optically reading coded indicia having parts of different light reflectivity, comprising:
   a) a reader aimable at an indicium to be read, the reader including a scan engine supported by the reader, a scanner for scanning the indicium, a decoder for generating a decoded, digital, data signal representing the indicium, a radio frequency transmitter supported by the reader and operative for transmitting the decoded, digital, data signal away from the reader by a low power, wireless, radio frequency, communications protocol;
   b) a host for receiving and processing the decoded, digital, data signal transmitted by the transmitter, and for generating an acknowledgment signal; and
   c) an auditory annunciator spaced apart from the reader and the host and in wireless, radio frequency, communication with the host, for receiving the acknowledgment signal and, upon receipt thereof, for producing an acknowledgment sound audible to the user and indicative that the host received the decoded, digital, data signal.

24. The system of claim 23, wherein the annunciator has an identifier having parts of different light reflectivity that are electro-optically readable by the reader during a set-up mode; and wherein the reader is operative for transmitting an annunciator identifying signal corresponding to the identifier, together with the decoded digital data signal, to the host for associating the annunciator with the reader.

* * * * *